Nov. 29, 1960 W. OLIVER 2,962,043
AUTOMATIC ROTARY FLOOD VALVES
Filed Oct. 22, 1957 2 Sheets-Sheet 1

INVENTOR.
William Oliver
BY John F. Brezina
Att'y

Nov. 29, 1960  W. OLIVER  2,962,043
AUTOMATIC ROTARY FLOOD VALVES
Filed Oct. 22, 1957  2 Sheets-Sheet 2

INVENTOR.
William Oliver
BY John F. Brezina
Atty 2,962,043
Patented Nov. 29, 1960

2,962,043

AUTOMATIC ROTARY FLOOD VALVES

William Oliver, 4423 N. Central Ave., Chicago 30, Ill.

Filed Oct. 22, 1957, Ser. No. 691,584

5 Claims. (Cl. 137—409)

This invention is directed to novel automatic means and mechanism for preventing back-flow of water or the like from sewers, and to provide a self-acting novel valve means which is adapted to be closed by elevation of the liquid level on the outlet side of a sewer line.

A number of types of closable valves have been devised for installation in sewers to prevent the flow of water backward in sewer pipes and into basements, and which have not been satisfactory and have been impractical, and too complicated from the further standpoint that the same have failed to operate due to becoming frequently clogged by the solids in the liquid and in the backwater in the sewer.

It is an important object of my invention to provide an easily installable device for preventing back-flow, which partially comprises a housing, having end fittings thereon to facilitate its mounting and connection in a sewer line, for example, in place of one or more removed sections of sewer pipe, and which device has an intermediate inner partition wall or baffle having openings therein, in combination with an annular plate-like valve rotatably mounted on the middle portion of said partition, and wherein a float is suitably connected to a portion of said rotatable valve element which is actuable by liquid to close and open said valve element.

Another object of my invention is to provide an easily-installable device for automatically preventing the reverse flow of water from a sewer to prevent back-flow into basements or the like, which includes the combination of an openable substantially-cylindrical housing having an apertured transversely-extending partition therein, and having a disk-like valve element co-axially and rotatably mounted on said partition, said valve element having float means thereon and having a peripheral recess adapted to register with an opening in said partition, and having means for limiting the rotative movement of said valve element.

Numeral 10 designates an elongated metal casing or housing which is preferably cylindrical, and having apertured end walls, in one of which is mounted an inlet fitting or flanged nipple 11, and in the opposite wall, a male fitting or nipple 12 is mounted. Said nipples 11 and 12 facilitate a mounting of the device in a stationary sewer line, from which one or more pipe sections are removed so as to interpose and mount my device therein.

Figure 1:
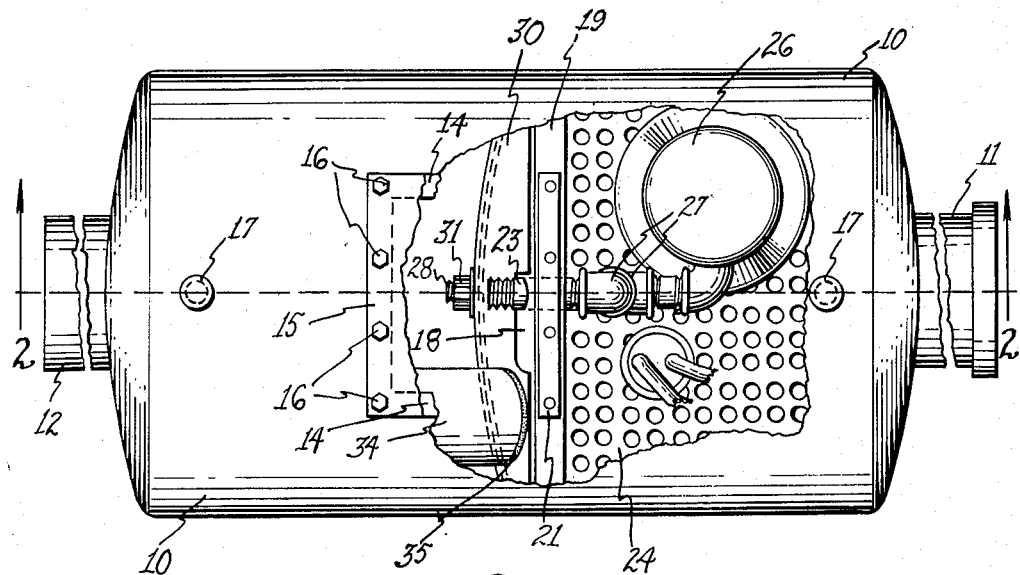
Figure 1 is a top plan view of my valve device, with parts of the wall broken away to show interior parts in elevation.
Figure 2:
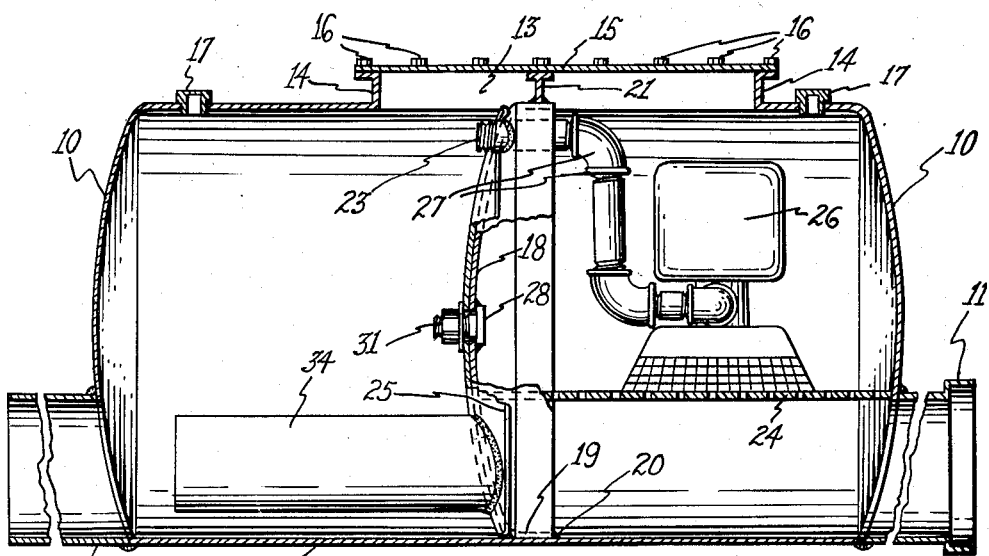
Figure 2 is a cross-sectional view taken on a vertical plane substantially indicated by line 2—2 of Figure 1.

Housing 10 has an enlarged upper opening 13, which is preferably defined by an outwardly-extending integral flange 14, which flange has a plurality of spaced-apart threaded apertures therein (not shown). Said flange preferably is of rectangular form and its upper face is in a common plane to receive a suitable plate-like cover or closure 15. Cover 15 is preferably of metal and has a plurality of spaced-apart peripheral apertures therein, and is normally mounted removably on flange 14 by a plurality of threaded screws 16, as illustrated in Figs. 1 and 2. Said housing 10 preferably has a pair of threaded vent openings in its opposite end portions. Said vent openings normally have mounted therein the end portions of vent pipes 17, only fragments of which are shown, and which lead to the usual vent pipes of the plumbing system.

Mounted in upwardly and downwardly-extending direction in the middle portion of said housing 10, preferably by welding, is a baffle wall or partition 18, which is preferably made of non-corrosive metal or stainless steel, and which in my preferred form is of concavo-convex shape. Said baffle or partition 18 has integral peripheral flange 19, which is of a shape and size to fit snugly and transversely within the middle portion of the housing 10, said partition and flange being preferably secured by welding or the like, as indicated at 20.

Said partition 18 has a relatively large lower opening or recess 22 therein, through which the sewerage and liquids normally flow when the valve is in opened position. As illustrated in Figure 1, a bridging cross bar 21 is secured transversely and in normally-horizontal position across the opening defined by the flange 14, the opposite ends of said metal cross bar 21 being secured by welding (not shown) to diametrically opposite portions of flange 14.

The upper portion of the partition 18, has an opening 23a therein in which is mounted a suitable pipe section or nipple 23, as illustrated in Figures 1, 2, 4 and 5, and said nipple is connected to additional pipe section and fittings leading from a pipe as hereinafter described.

Mounted in the lower portion of the normally inlet chamber of the housing, as illustrated at the right of Fig. 2, is a perforated horizontal wall, shelf for strainer 23 whose ends engage and are mounted against one end wall of housing 10 and against one face of partition 18. A short vertical supporting panel 25 is secured between the inner-end portion of shelf 24 and the lower part of the flange 19, as shown in Fig. 2. Panel or shield 25 has a passage therethrough (not shown) in alinement with the lower opening in partition 18.

As illustrated in Fig. 1, an electrally-driven liquid pump 26 is securely mounted on said shelf 24, and it is connected by circuit wires (not shown) to an electric suppply source.

The discharge opening of said pump 26 is connected by connection fittings 27, including elbows as shown to the pipe. Said pump is a submersible type sump pump having a float 26 as illustrated in Fig. 2. It will operate when the liquid in the inlet chamber reaches a predetermined level.

Figure 3:
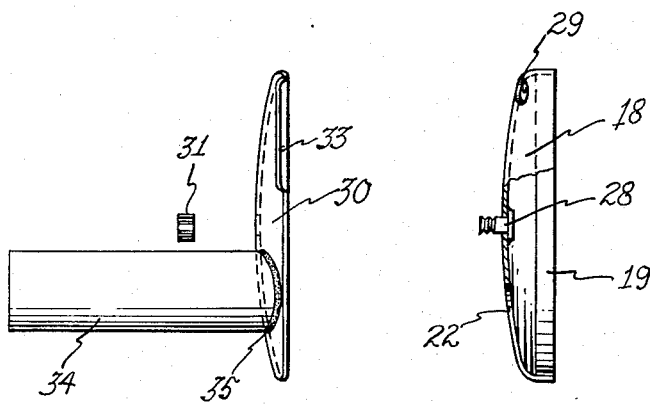
Figure 3 is an elevation looking at the edge portion of the rotatable valve element and showing the attached float in elevation, and showing separate and spaced therefrom the stationary baffle or partition on which said valve element is rotatably mounted.

Mounted in an opening in the axial center of partition 18 is a threaded bearing or bolt 28, as shown in Figs. 2 and 3. A disk-like valve member 30 having a central aperture is journaled on the bearing bolt 28 with the aid of a nut 31, so that one face of the valve member will slidably engage and rock or rotate adjacent the partition 18. Said valve member 30 is shown in Fig. 2. As separated from the said partition 18, in Figs. 4 and 5 the same are illustrated as mounted together.

Figures 4, 5:
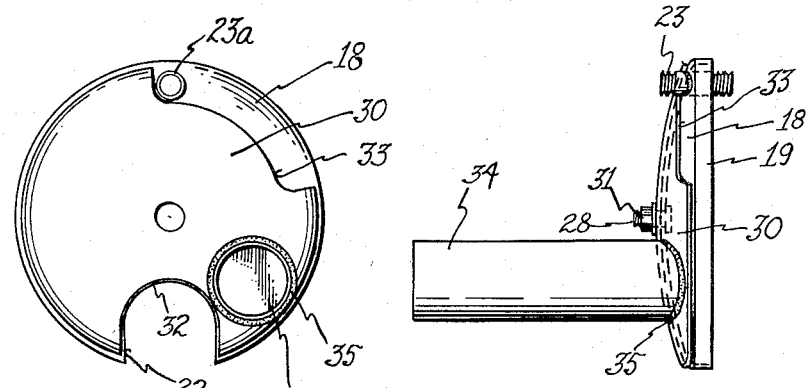
Figure 4 is an elevation of the movable valve element in normal mounted position on the stationary partition which is secured in the middle portion of the housing as hereinafter described.
Figure 5 is an elevational view of said assembled valve element and partition, and looking at the right-hand portion of Figure 5.

Valve member 30 has a peripheral recess or opening 32 formed therein, which normally registers with the opening or passage in the lower part of partition 18. Said valve member 30 also has an elongated recess or slot 33 in the upper peripheral portion, as shown in Figs. 4 and 5, and the ends of said recess or slot 33 are adapted to engage the pipe 23 to limit the rotative movement of said valve element.

Numeral 34 designates an elongated hollow float, of plastic or metal, which is preferably cylindrical and extends substantially horizontally and into the outlet chamber, as shown at the left of Figs. 1, 2, and 3.

One end portion of the sealed float 34 is secured by fusion or by welding to the peripheral portion of rockable valve element 30, as indicated at 35 in Figs. 1 to 5. The position of float is inward of the periphery of said valve element, as indicated, so that it is normally spaced from the bottom portion of the housing 10, and to avoid being obstructed by normal liquid flow or by solids which may accumulate in the housing.

In normal operation the sewerage, comprising the liquid and such solids as it may normally carry, flows into and through the nipple 11 and through the housing, and through the registering lower openings of the partition 18 and valve element 30, and continues on through the lower portion of the housing and into and through the outlet nipple 12, and downward into and through the sewer system. The normal amount of sewerage or drainage flow is not sufficient to raise or elevate the float 34.

Whenever the portion of the sewer system and pipes which are on the outlet side of my device fills up due to back-pressure of liquid which has arisen in the street or yard sewer, reverse or back-flow is created so that the water will back up into the housing 10 to thereby raise the float 34 in an arcuate path which latter upward movement will cause a rotation of the disk-like valve element 30, which movement will thereby cause a peripheral portion of valve element 30 to seal the lower passage through partition 18. When this occurs, the reverse or back-flow is stopped. It will be understood that the rocking movement of valve element 30 will continue until the end portion of slot 33 engages the outside of the nipple or pipe section 23. During the short interval of back-flow aforesaid, a limited quantity of liquid will have run into the other chamber of the housing 10 both below and above the perforated shelf 24. When the amount of such reverse-flowing liquid which enters the normally inlet chamber of the housing 10 reaches a level wherein it will cause the motor of pump 26 to be energized to cause a pumping out of the liquid in said chamber into and through the pipe connections 27, pipe nipple 23, to be discharged into the chamber on the normally outlet side of the housing, which last-mentioned chamber is illustrated at the left of Figs. 1 and 2.

When the water table receeds from the outside sewer system sufficiently, the liquid level within the outlet chamber will be lowered to a point where the rotatable valve element will return to original open position.

My invention having the herein described novel features provides an automatically closable device for preventing flooding of basements, and which is relatively easy to install and relatively economical to manufacture and assemble. A further major advantage is that normal solids and foreign material carried by sewer water will not clog the device so as to prevent closing and opening of the movable valve elements and float.

I have found that by making the intermediate baffle, valve element and float, and certain other parts, of material which is not damaged by rust and by normally encountered acids, insures long life and satisfactory operation.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a device for regulating the flow of liquid in a sewer line; an elongated housing having a removable closure and having integral end fittings adapted to be connected with sections of sewer pipe; a metal partition mounted in said housing, said partition having a peripheral lower opening; a disk-shaped valve member rotatably mounted on the middle portion of said partition and disposed adjacent said partition, a bolt pivotally securing the center portion of said valve member to said partition, said valve member having a peripheral recess adapted to register with said partition opening; an elongated float secured on the face of said valve element, and means for limiting the rotative movement of said valve element, said float, when elevated, being adapted to rotate said valve member to close the opening through said partition.

2. In a device for regulating the flow of liquid in a sewer line; a housing having a removable closure and having integral end fittings adapted to be connected in a sewer line; a metal baffle mounted in said housing, said baffle having a lower opening; an annular concave valve member rotatably mounted on the middle portion of said baffle and slidably engaging said partition; a float secured on the face of said valve element, and means for limiting the rotating movement of said valve member, said float, when elevated, being adapted to rotate said valve member to close said lower opening through said baffle.

3. In a device for preventing backwater from entering portions of a sewer line; an elongated housing having end fittings connectable to a sewer line, said housing having a removable cover; a concavo-convex metal partition secured in the middle portion of said housing to divide said housing into separate inlet and outlet compartments; said partition having an upper flow opening therein and having a lower opening therein; a disk-shaped valve element axially journalled on said partition in a position substantially parallel to said partition and having a peripheral recess therein normally in alignment with and adapted to close the said lower opening of said partition; a pipe in said upper flow opening of said partition and providing a passage for liquid flow between said compartments; and a float member mounted on one face of said valve element, the rise of liquid in said housing being adapted to raise said float member and move said valve element to stop backflow from portions of a sewer line on the outlet of said housing.

4. In a device for automatically closing the path of a sewer line to prevent backflow, a substantially elongated housing having a removably mounted cover, said housing having end fittings connectable in a sewer line; a concave metal partition secured in the middle portion of said housing, said partition dividing said housing into an inlet and an outlet chamber having a lower flow opening therein; a disk-shaped concave valve element rotatably mounted on said partition, said valve element having a peripheral recess therein adapted to normally register with the lower opening of said partition; a liquid-responsive float mounted on said valve element and within the normal discharge portion of said housing, said liquid-responsive float, when elevated, being adapted to move said valve element to close said flow opening.

5. An automatically actuable sewer float-operated valve device comprising an elongated housing having end fittings connectable in a sewer line, a removable cover for said housing; an upwardly extending metal partition mounted in said housing and providing an inlet chamber and an outlet chamber, said partition having a lower opening therein to provide for normal flow; a disk-shaped valve member journalled to rotate in a plane substantially parallel to the plane of said partition and being adjacent to said partition, said valve member having a peripheral opening; and an elongated float having one end thereof secured on said valve member and extending into the outlet chamber of said housing, the elevation of said float being adapted to rotate said valve member to close said lower opening in said partition.

References Cited in the file of this patent

UNITED STATES PATENTS

| Number | Name | Date |
|---|---|---|
| 1,252,099 | Donovan | Jan. 1, 1918 |
| 1,544,608 | Smith et al. | July 7, 1925 |
| 1,732,319 | Wagner | Oct. 22, 1929 |
| 1,861,397 | Khun | May 31, 1932 |
| 1,919,779 | Enright | July 25, 1933 |
| 2,146,260 | Kirgan | Feb. 7, 1939 |
| 2,347,544 | De Costa et al. | Apr. 25, 1944 |
| 2,549,204 | Kaddatz | Apr. 17, 1951 |
| 2,607,493 | Gordon | Aug. 19, 1952 |
| 2,844,163 | Steinberg | July 22, 1958 |
| 2,882,919 | Brown | Apr. 21, 1959 |

FOREIGN PATENTS

| Number | Country | Date |
|---|---|---|
| 3,862 | Great Britain | of 1882 |